United States Patent [19]

Colditz

[11] Patent Number: 4,905,325
[45] Date of Patent: Mar. 6, 1990

[54] AUTOMATIC WASTE DUMP AND CLEANING SYSTEM

[75] Inventor: Eugene R. Colditz, Huntington Beach, Calif.

[73] Assignee: Kaiser Aerospace & Electronics Corporation, Oakland, Calif.

[21] Appl. No.: 74,611

[22] Filed: Jul. 17, 1986

[51] Int. Cl.$^4$ ............................................. B64D 11/02
[52] U.S. Cl. .......................................... 4/321; 4/316; 134/57 R; 134/166 R; 134/169 R
[58] Field of Search ............ 4/378, 405, 300, 316–323; 134/57 R, 169 R, 166 R; 137/15, 237, 391

[56] References Cited

U.S. PATENT DOCUMENTS

| | | | |
|---|---|---|---|
| 2,570,148 | 10/1951 | Neuroth et al. | 137/387 |
| 3,067,433 | 12/1962 | Dietz et al. | 4/317 |
| 3,579,651 | 5/1971 | Russo | 4/316 |
| 4,063,315 | 12/1977 | Carolan | 4/316 |
| 4,156,297 | 5/1979 | Pilolla | 4/321 |
| 4,516,281 | 5/1985 | MacPherson et al. | 4/319 |

Primary Examiner—Henry J. Recla
Assistant Examiner—J. Casimer Jacyna
Attorney, Agent, or Firm—Marvin H. Kleinberg; Matthew F. Jodziewicz

[57] ABSTRACT

A waste tank cleaning system in a preferred embodiment includes a flowmeter interposed in the line carrying cleaning fluid to the tank. A pair of solenoid valves are controlled by an electronic counter coupled to the flowmeter. In response to predetermined volumetric flows of fluid, the solenoid valves alternatively deliver fluid to a hydraulically operated drain valve and to a spray/rinse outlet in the waste tank. In one alternative embodiment, a flowmeter is mechanically coupled to a valve structure which alternatively applies fluid to the drain valve and to a spray/rinse outlet in the tank, directly. In other embodiments, the volume of flow can be determined by liquid level sensors in the tank and a predetermined cleaning sequence can be carried out based on the signals sent by the sensors. Power can be furnished by a rechargeable power supply.

18 Claims, 4 Drawing Sheets

AUTOMATIC WASTE DUMP AND CLEANING SYSTEM

BACKGROUND OF THE INVENTION

1. Field of the Invention

The present invention relates to waste tank servicing assemblies and more particularly to a combination of a flowmeter with a flow valve assembly operating a fluid operated waste drain valve and spray/rinse apparatus adapted to be installed in an aircraft lavatory waste tank.

2. Description of the Prior Art

In some aircraft lavatory systems currently in use, a common waste tank is provided in conjunction with more than one lavatory unit. In others, a tank is provided for each lavatory. During a flight, the waste tank, which may be used with a recirculating toilet system or, alternatively, with a fresh water system, is utilized to retain human wastes. At the conclusion of a flight, the tank is drained and cleaned by ground service personnel. During that process, the tank is rinsed out with a cleaning fluid which may include deodorants and disinfectants, and is provided with a predetermined quantity of precharge liquid (depending on the installation), prior to the next flight of the aircraft.

In waste systems of the prior art, the tank drain valve is connected through a cable assembly to a manual release mechanism which is located at the service panel. As noted in U.S. Pat. No. 4,338,689, issued July 13, 1982, to Clifford V. Zieg and assigned to the assignee of the present invention, alignment problems were encountered with a valve that was manually operable through a cable. Prior art systems employed a long rigid extension tube to assure continued alignment of the valve in the valve seat. The patent to Zieg, however, illustrated a novel, elastomeric valve plug which could accommodate some degree of misalignment and still form an adequate seal for the tank.

The tanks of the prior art also included a special drain fitting or nipple which was adapted to connect to a servicing vehicle. The vehicle supplied a cleaning and rinsing fluid to an intake port which applied the fluid to the interior of the tank through a spray system. After the drain valve was seated, the same spray system was used to impart a premeasured precharge to the tank, necessary for recirculating toilet systems.

In servicing a waste tank according to prior art, a technician would couple a waste line to the nipple at the service panel. The technician would then manually, through use of a cable into the coupled waste line. A cleaning fluid line would then be connected to the intake port and a combination of a cleaning and disinfecting fluid was applied through a spray line, cleaning the interior of the tank while the drain valve was kept open.

After a predetermined time interval, usually after the prescribed volume of fluid had been delivered, the drain valve would be closed by releasing the cable. The tank was then filled to approximately 75% capacity by permitting additional, rinsing/cleaning fluid to be supplied until the predetermined quantity of fluid had been furnished. The technician would then manually dump the tank contents again and finally fill the tank with a precharged quantity. Tank trucks frequently are fitted with meters which display the quantity of fluid that has been delivered.

The prior art system became a source of at least two major problems, even with the modified drain plug of the Zieg invention. One problem was cable breakage which required a partial disassembly of the tank and aircraft to reinstall a new cable system. In addition, the various elements of the cable system required service and maintenance and, because of the hostile environment, from time to time would become inoperable, preventing the operation of the drain valve.

A second, potentially more serious problem is the service technician, who, either through inattention or carelessness, fails to shut off the cleaning/rising supply after the specified volume has been furnished or time interval has elapsed, resulting in an excessive precharge in the tank. In some instances, this could impose a premature limit on the usage of the lavatory, since, once the tank is determined to be full, further usage is prohibited. Since this circumstance usually occurs during the flight, those lavatories which are coupled to the tank must be taken out of service.

A more serious consequence of technician inattention is the overflow of the tank during servicing. Serious structural damage to the aircraft could result since the cleaning/rinsing fluid tends to be highly corrosive to metallic parts. Moreover, any overflow into the lavatory compartment or into the inaccessible interior of the fuselage of the aircraft creates a potential hazard to the integrity of the structural and control elements of the aircraft.

U.S. Pat. No. 4,584,726, issued Apr. 29, 1986, to Grills, et al., and assigned to the assignee of the present invention illustrated a waste drain valve assembly that automatically opens upon the application of cleaning/rinsing fluid and at the same time provides a predetermined quantity of precharge fluid to the tank, specific to the type of aircraft being serviced without any special attention required of the service technician. The service technician merely attaches a line providing cleaning and rinsing fluid to an intake line leading to the waste drain valve assembly and shuts down the system after a prescribed time interval has elapsed. A built-in precharge reservoir then supplies the proper quantity of fluid as a precharge, after the valve has closed.

Although the improvements of the Grills, et al., invention eliminates the possibility that the service technician will give the tank an excess precharge, his attention is still required to insure that the fluid is delivered to the waste drain valve assembly for the proper fluid quantity or minimum time interval necessary to drain and rinse the tank. Carelessness or inattentiveness of the service technician could result in wasteful quantities of cleaning/rinsing fluid being run through the system, since any quantities of fluid in excess of the amount required to rinse would be emptied through the fluid operated drain valve.

What is needed, and what has been provided in the present invention, is a system that measures the delivery of fluid to the waste drain valve and automatically terminates the cleaning cycle upon delivery of a predetermined quantity of fluid. The service technician need only hook up the fluid supply line to the fluid intake line, turn on the fluid supply and the system insures that the proper measure of fluid is delivered to the waste tank, freeing the service technician to do other tasks.

3. Summary Of The Invention

In a preferred embodiment, an improved lavatory waste tank cleaning system includes a flow meter which activates valves that provide fluid to a fluid operated waste drain valve and to a rinsing and cleaning system.

The flow meter is coupled to the intake port and meters the delivery of fluid to the system.

In the preferred embodiment, the flow meter operates the flow valves through an electronic counter and solenoid valve system. The flow meter delivers a train of electronic pulses to the electronic counter. The electronic counter recognizes a predetermined pulse count and opens and closes a pair of solenoid valves, in a predetermined sequence, alternatively delivering fluid to the waste dump valve and the cleaning/rinsing system, and to the waste tank. A rechargeable battery power supply energizes the electronic system in the absence of other sources of power. The battery is charged during flight. A pressure switch may be included which suppresses the counter until a predetermined pressure is reached in the line. The pressure switch can also function to hold the valves closed at the completion of a cycle until the pressure drops below the predetermined level.

In the preferred embodiment, the initial provision of fluid flow through the first flow valve into the fluid operated waste drain valve operates the drain valve, dumping the contents of the tank. As the valve is held open, additional fluid is routed to a rinse-spray structure which cleans the interior of the tank. After a predetermined volume of fluid flows through the flow meter, the counter signals the closing of the first, normally open solenoid flow valve.

One typical waste drain valve is disclosed in the recently issued U.S. Pat. No. 4,584,726, to Grills et al., assigned to the assignee of the present invention. The drain valve includes a hydraulic piston with a return spring whose force can be overcome by fluid pressure. The flow from the pressurized source of fluid, usually a service vehicle, thereby opens the drain valve. The continued provision of cleaning/rinsing fluid to the system through the normally open first flow valve maintains the drain valve in the open position.

Fluid flowing through the first flow valve and piston chamber enters the spray rinse system through a check valve. The continued provision of fluid under pressure to the first flow valve thus provides for the simultaneous cleaning, rinsing and draining of the waste tank.

When enough fluid has been supplied to the system for rinsing the waste tank, the counter commands the energizing of the first solenoid flow valve, closing it to further flow. The fluid pressure at the waste dump valve is reduced, enabling the force of the return spring to overcome the force of the fluid pressure, thereby allowing the waste drain or dump valve to close.

A second, preprogrammed volume of fluid is now provided to the second flow valve which delivers it directly into the waste tank through the spray rinse system. The second flow valve remains open for a premeasured quantity of fluid. The counter signals the second solenoid flow valve to close after the proper quantity of fluid has been dispensed to the tank. An optional signal lamp can be placed at the service panel to indicate to the service operator that the cycle has been completed.

When the operator at the source of fluid recognizes that the cycle is completed, he may cut off the fluid supply to the intake line and the flow meter. Where a pressure switch is used, the valves are held closed until the fluid supply is cut off. The first flow valve then opens in readiness for the next cycle. The fluid already in the waste tank then serves as a "precharge", which can prevent wastes from adhering to "dry" areas of the tank and, more importantly, provides the necessary "precharge" or minimum volume needed for operating a recirculating toilet system.

Because aircraft in a servicing area frequently lack an on board power supply, in the preferred embodiment, the system has a built in power supply which operates with a small rechargeable battery. The battery is charged by the aircraft electrical power system during flight. In the absence of other sources of power, the battery is sufficient to provide power to the flowmeter, the electronic module and the solenoid valves during the cleaning cycle.

In an alternative embodiment, a positive displacement flowmeter is driven mechanically and operates the flow valves by rotating a programmed control valve that delivers a predetermined volume of fluid to the waste drain valve and the cleaning system. The control valve has fluid flow orifices in its walls which are positioned to alternatively provide fluid to the waste drain valve and the cleaning system, depending on the rotational position of the control valve. The flowmeter thus rotates the control valve through various stages of its cycle, depending on the volume of fluid delivered to the flowmeter.

In other embodiments, the measurement of fluid is accomplished by liquid level sensors that are positioned in the waste tank. A first sensor indicates that the tank is empty, a second sensor could signal the appropriate precharge level and a third sensor would signal that the tank is at its fill limit. An additional sensor could signal an intermediate fluid volume which could be used during the cleaning cycle to command opening of the waste drain valve during the "rinse" portion of the cycle.

It is within the scope of the present invention to use alternative configurations of apparatus and to measure the fluid usage differently. For example, one alternative method of operation would utilize a timer and impose a different sequence of actions. Since most tanks are provided with one or more liquid level sensors, it is possible to apply fluid to the first solenoid valve opening the hydraulically operated drain valve. After a brief interval sufficient to drain the contents of the tank, the first valve can be energized to close, thereby closing the drain valve, as well.

The second solenoid valve can then be energized, providing fluid to the waste tank until an intermediate liquid level sensor signals a partially full tank. The second valve can then be closed and the first valve reopened, operating the drain valve and again dumping the contents of the tank. The first valve is again closed and the second valve opened, this time to deliver the precharge. One of the liquid level sensors is positioned to signal when an adequate amount of precharge has been added to the tank, at which time the second valve is again closed and the cycle is completed.

DESCRIPTION OF THE DRAWINGS

Further advantages and features of the present invention will be more fully apparent to those skilled in the art to which the invention pertains from the ensuing detailed description thereof, regarded in conjunction with the accompanying drawings wherein like reference characters refer to like parts throughout and in which.

DETAILED DESCRIPTION

Figure 1:
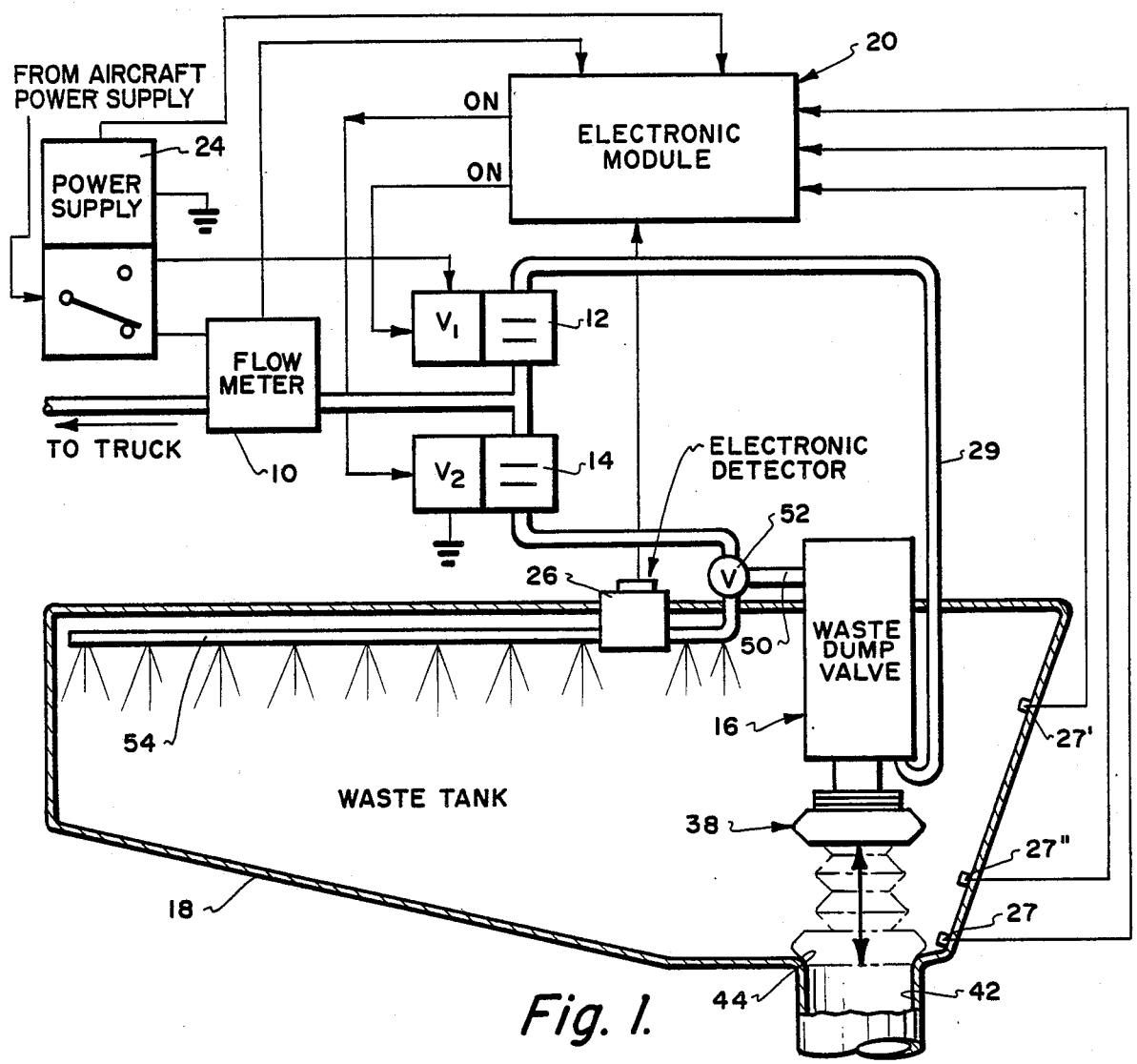
FIG. 1 illustrates an AUTOMATIC WASTE DUMP AND CLEANING SYSTEM according to the present invention controlled by a flow meter in idealized diagrammatic form.

Turning first to FIG. 1, flow meter 10 is interposed in the fluid line leading to a pair of solenoid valves 12 and 14. A first solenoid valve 12 is normally open and is connected to a waste dump valve system 16. The valve 12 is normally open so that in the event of a failure, fluid flow from a service vehicle will operate the waste dump valve, draining all applied fluid from a waste tank 18. A second, normally closed solenoid valve 14 is connected to deliver fluid to the waste tank 18.

Figure 2:
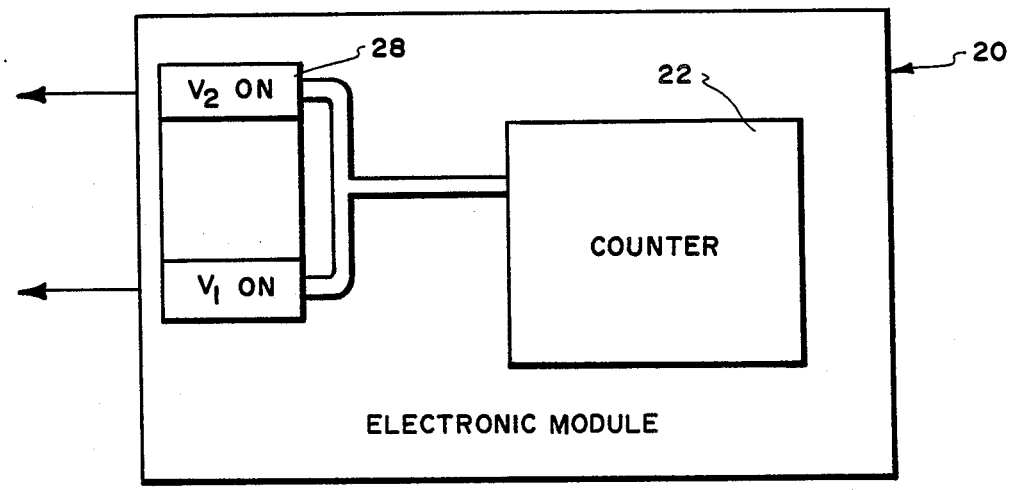
FIG. 2 illustrates a detailed internal view of the electronic module 20 of FIG. 1.

The flow meter 10 is also connected to an electronic module and delivers a train of electronic pulses to an electronic counter 22 within the electronic module 20, see FIG. 2. After a predetermined count of pulses, the counter 22 energizes and thereby closes the first solenoid valve 12 after a preprogrammed rinsing of the waste tank has been completed. The second solenoid valve 14 is energized, opening it to deliver a predetermined precharge quantity of fluid to the waste tank 18.

The flow meter 10, the electronic module 20 and the solenoid valves 12 and 14 are powered by a self-contained power supply 24 which operates with a rechargeable battery (not shown) that can be "trickle charged" by the aircraft power supply during flight.

The flow meter controlled system can also be equipped with an electronic fluid level detector 26 which acts as a back-up, over-fill detector which will either alarm or shut down the system when the waste tank 18 has been filled to its maximum operating level. Additional level sensors 27, 27', 27" are provided to signal an empty tank, an interim sensing fill level and a precharge level, respectively, which can be used in alternative operating modes, described below.

As cleaning and rinsing fluid is provided to the flow meter 10, a train of electronic pulses is applied to the counter 22 within the electronic module 20.

Turning next to FIG. 2, when the electronic counter 22 signals a predetermined count of electronic pulses, corresponding to a predetermined volume of fluid, appropriate command signals are generated and applied to both the first and second solenoid valves through appropriate circuits 28, causing the closing of the normally open first solenoid valve 12.

Figure 3:
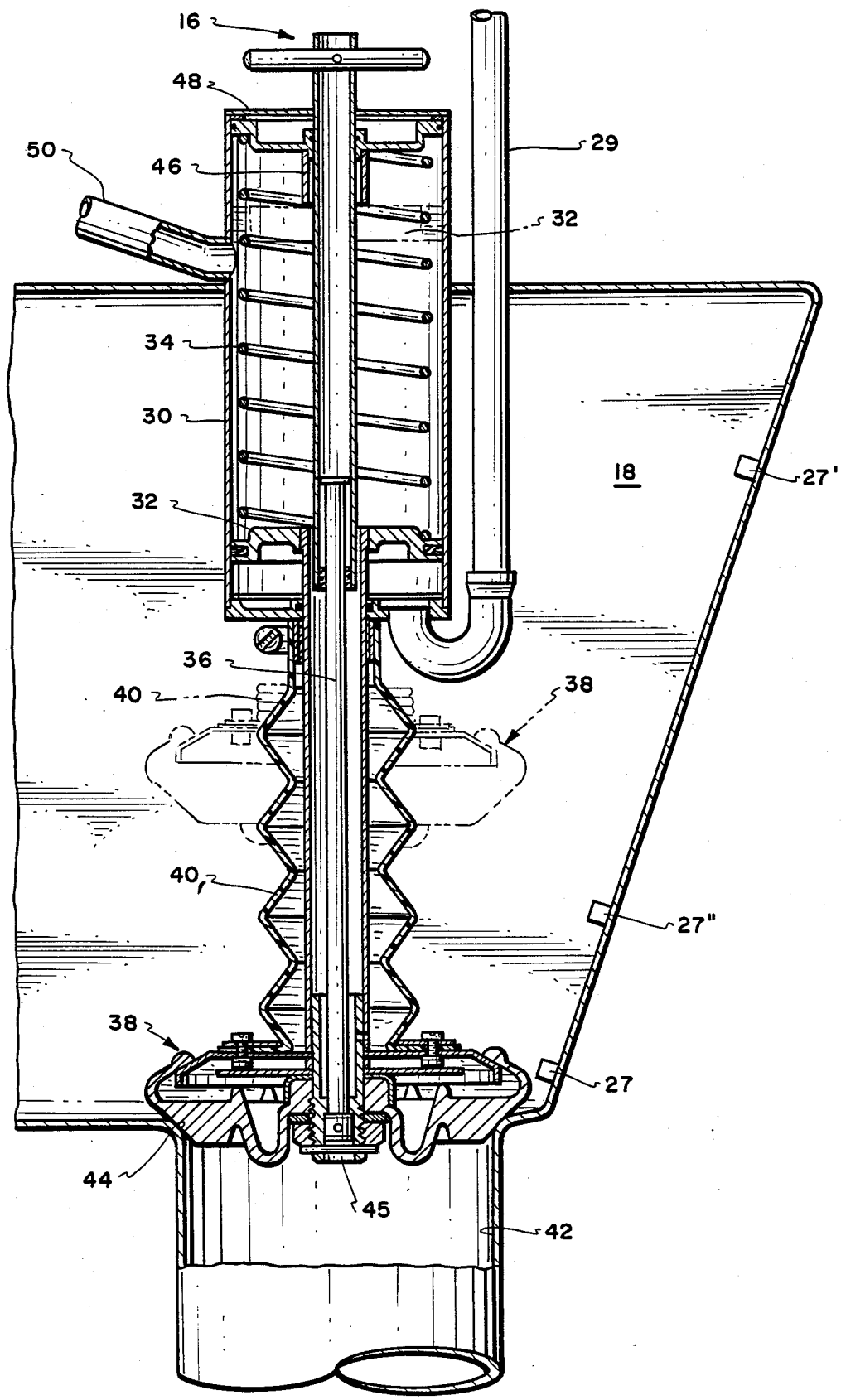
FIG. 3 illustrates a fluid operated drain value.

Turning to FIG. 3, the initial supply of fluid through the flowmeter 10 and first solenoid valve 12 is delivered to the waste dump valve assembly 16 The waste dump valve assembly 16 is located within the waste tank 18 which is installed in the aircraft. A fluid intake line 29 provides fluid from the normally open first solenoid valve 12 to the waste dump valve assembly 16. The dump valve assembly 16 includes a piston housing 30, a movable piston 32 and a return spring 34 that is adapted to bias the piston 32 into the fully extended or closed valve configuration.

Coupled to the piston 32, is an actuator rod 36 that terminates in a self-aligning valve assembly 38, as illustrated in the U.S. Pat. No. 4,338,689. to Zeig. As in Zieg, a bellows assembly 40 surrounds the actuator rod 36 and tends to exclude the contents of the waste tank 18 from the interior of the bellows 40 and the dump valve assembly 16.

A drain orifice 42 at the base of the tank 18 is normally maintained closed by the bias on the piston 32 with the valve assembly 38 engaging a valve seat 44 at the bottom of the tank 18. A pressure relief opening 45 extends through the fluid intake line 29 to facilitate seating of the valve assembly 38. At the upper limit of piston travel, a stop assembly 46, which is part of a cap assembly 48 of the piston housing 30, is provided. At this position, the fluid freely flows through the interior of the housing 30 to an outlet conduit 50 which is coupled through a check valve 52 to a spray ring 54.

The continued provision of a flow of fluid to the waste dump valve 16 applies a fluid pressure to the piston 32 sufficient to drive the piston 32 to its upper limit of travel, fully compressing the bias spring 34 and opening the drain orifice 42. At this point the bellows 40 is compressed and the self aligning valve assembly 38 is fully disengaged from the drain orifice 42 of the tank 18, thus draining the tank 18, as seen in phantom lines.

As fluid is applied to the dump valve assembly 16, once the hydraulically driven piston 32 moves to its upper limit position, the fluid then goes through the outlet conduit 50 to start cleaning the waste tank. The spray and rinse ring 54 applies fluid to the interior surface of the tank which then drains from the tank through the open drain orifice 42.

As noted above, when a preprogrammed volume of fluid has been delivered through flowmeter 10 to the first solenoid valve 12, the electronic counter 22 recognizes a predetermined count and signals the solenoid valves 12, 14. Closing the first solenoid valve 12 terminates the flow of fluid to the waste dump valve 16, reducing fluid pressure to the piston 32, which allows the force of the bias spring 34 to prevail, forcing the piston 32 downward, thereby seating the valve assembly 38 in the valve seat 44, occluding the drain orifice 42. Any fluid trapped within the piston housing 30 is expelled through the pressure relief opening 45 into the waste tank 18.

Fluid continues to be delivered to the flow meter 10 and flows through the now open second solenoid valve 14 into the waste tank 18 through the rinse ring assembly 54. Upon delivery of a further predetermined volume of fluid, sufficient to precharge the waste tank 18, the electronic counter 22 reaches a count which corresponds to that volume, and signals the second solenoid valve 14, through the control module 28. The valve 14 closes and the system is ready for a new cycle. A pressure switch (not shown), if installed, can determine when pressurized fluid is no longer being supplied to the system. In that event, until the pressure drops, the first valve 12 is held closed. When the signal is removed from the control module 28, the first solenoid valve 12 returns to its normally open configuration.

The flow meter controlled system may also be equipped with an electronic detector 26 which senses the fluid level within the waste tank 18 to signal the electronic module 20 to close the second solenoid valve 14 in the event that there is an excess volume of fluid delivered to the waste tank.

Figure 4:
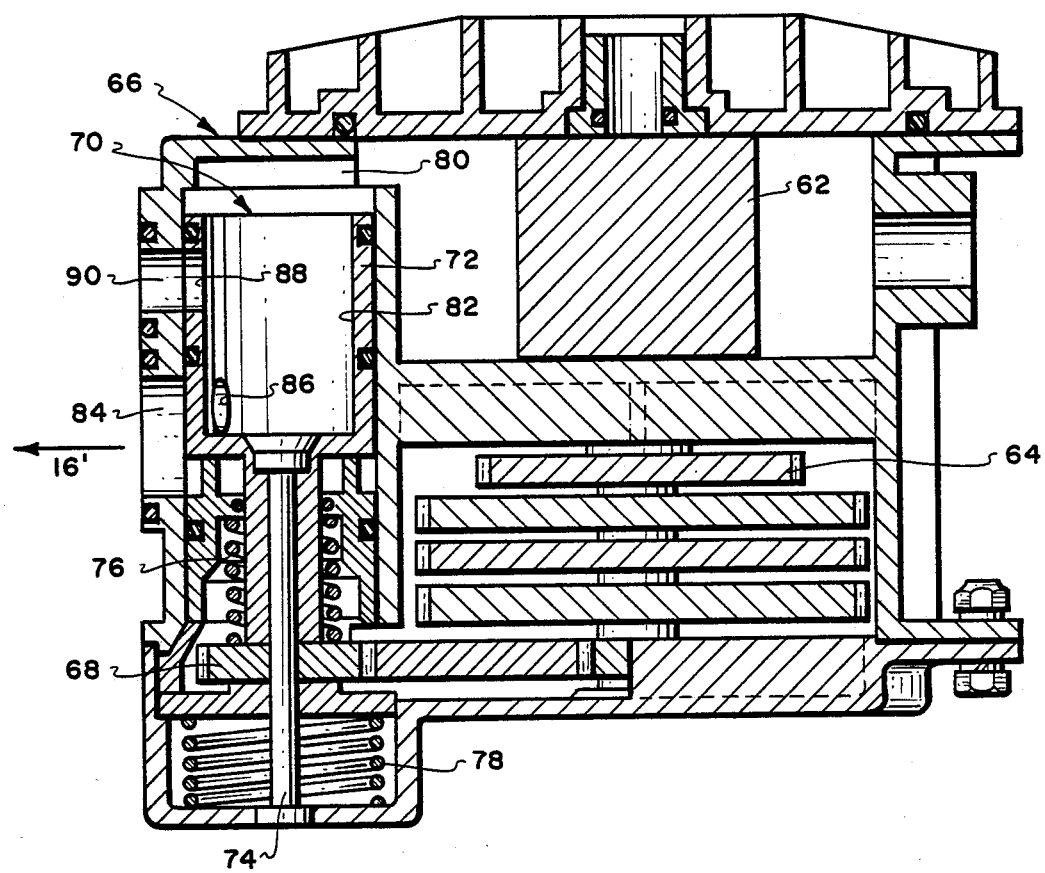
FIG. 4 illustrates a sectional view of an alternate embodiment of an AUTOMATIC WASTE DUMP AND CLEANING SYSTEM controlled by a different flowmeter.
Figure 6:
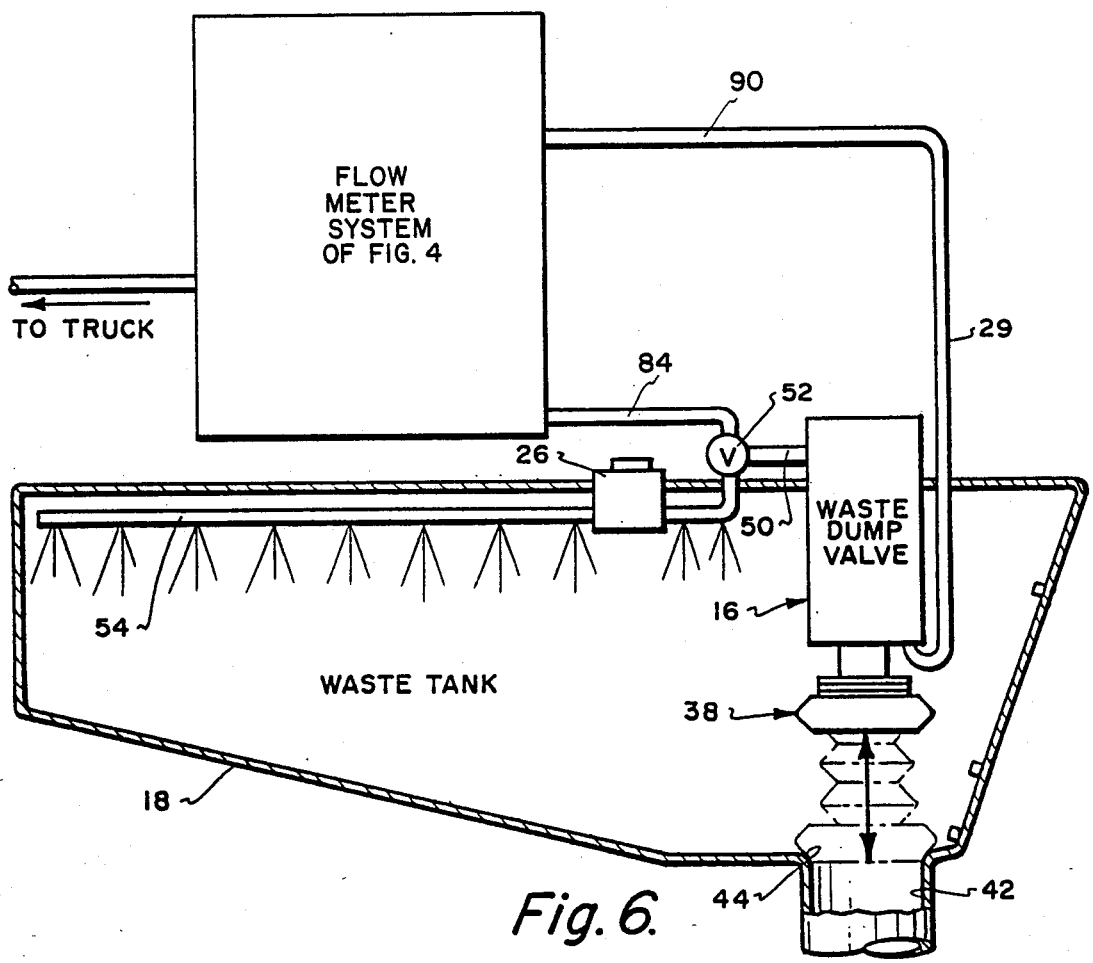
FIG. 6 illustrates the alternate embodiment flowmeter of FIG. 4 within the AUTOMATIC WASTE DUMP AND CLEANING SYSTEM of FIG. 1 in idealized diagrammatic form.

Turning next to FIG. 4, there is shown, in a sectional view, an alternative flowmeter controlled system 10'. FIG. 6 shows the alternative embodiment wherein flowmeter 10' is placed within the Automatic Waste Dump and Cleaning System of FIG. 1. In this embodiment, a positive displacement flowmeter 62, which is mechanically operated, is connected via an input shaft to a gear drive 64 which provides a substantial gear reduction. In one embodiment, a ratio of 250 to 1 was employed. The gear drive 64 is connected to a control valve cylinder housing 66 through a pressure operated clutch 68.

The control valve cylinder housing 66 contains a control valve 70 which includes a control valve cylinder 72 having fluid flow orifices in its wall and a control valve piston 74 which is coupled to the control valve cylinder 72 and engages the clutch 68.

The control valve piston 74 provides a linear, downward motion to the control valve cylinder 72 against a constant force return spring 76 which is placed at the bottom of the control valve cylinder housing 66.

The control valve cylinder 72 rotates axially on the piston 74 against a return bias 78. The top of the control valve cylinder housing 66 is connected to the outlet port of the flowmeter 80, which provides fluid under pressure to the control valve 70.

The initial supply of cleaning/rinsing fluid under pressure from the service truck flows through the flowmeter 62, to provide fluid to the control valve 70, which drives the piston 74 downward, aligning the fluid flow orifices in the cylinder 72 with outlet ports 84 and 90. The outlet ports 84 and 90 lead to a waste dump valve that is substantially similar to the one discussed in the preferred embodiment and to a rinsing means. The waste dump valve utilized in the alternate embodiment will be referred to as 16', and all of the elements of the waste dump valve 16' which are structurally similar to the elements of the waste dump valve of the preferred embodiment will be identified by similar reference numerals superscripted by a prime ('). The control valve 70 engages the gear drive 64 through the pressurized clutch 68.

As the fluid flows from the service truck, the flowmeter 62 rotates the gear drive 64 which transmits this rotational motion, through the engaged pressurized clutch to the cylinder 72.

Figure 5:
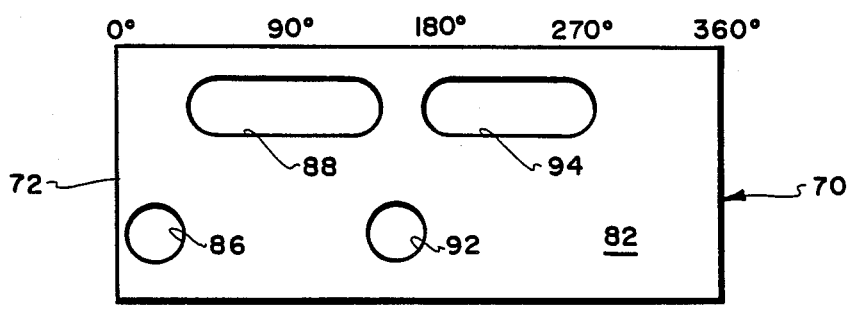
FIG. 5 illustrates a developed view of the cylinder wall of a valve according to the alternate embodiment.

Turning next to FIG. 5, the fluid flow orifices are positioned along the cylinder wall to regulate the flow of fluid to either the waste drain valve or the rinsing means, based upon the degree of revolution of the cylinder wall 82. After a predetermined amount of fluid is delivered through the flowmeter 62 to the control valve 70, the control valve is driven downward. The fluid flow through the flowmeter 62 has also rotated the control valve 70 via the gear drive 64 and engaged clutch 68. The control valve 70 is now in its initial rotational position.

This initial position of the control valve 70 aligns the cylinder wall 82 with the first outlet port 84 such that fluid flows through fluid flow orifice 86 to the waste dump valve 16'. The continued provision of fluid under pressure to the waste dump valve 16' disengages the self-aligning valve assembly 38' from the drain orifice 42', as explained in connection with FIG. 3 above, thus draining the waste tank 18'.

Upon completion of delivery of the desired amount of fluid to the waste dump valve 16', the control valve 70 rotates to its second rotational position. At this second position, flow to the waste dump valve 16' through the outlet port 84 is stopped and, instead, fluid flows through orifice 88 to a rinsing system (not shown) through the second outlet port 90.

As in the preferred embodiment, the termination of fluid flow to the waste dump valve 16' reduces fluid pressure to the piston 32' allowing the force of the bias spring 34' to prevail, forcing the piston 32' downward and seating the valve assembly 38' in the valve seat 44', occluding the drain orifice 42'.

A second desired amount of fluid is then delivered to the rinsing system which rinses the tank. Some of the fluid will drain from the tank before the waste dump valve 16' closes fully. Upon completion of delivery of the second desired amount of fluid, the control valve 70 has rotated to a third position, terminating the flow of fluid through orifice 88 and outlet port 90.

At its third position, the control valve 70 once again allows fluid to flow to the waste dump valve 16', this time by alignment of the outlet port 84 with the orifice 92. The piston 32' is again driven upward and the drain orifice 42' is again opened, allowing any rinsing fluid which remains in the tank to be drained.

Upon provision of a desired amount of fluid through orifice 92, the control valve cylinder 72 rotates to a fourth position, terminating all flow to the waste dump valve 16' via outlet port 84. Orifice 94 is aligned with outlet port 90, again allowing fluid to rinse the tank and providing a "precharge" for servicing the aircraft. It is clear that this cycle of operation can also be programmed into the system of the preferred embodiment.

In yet an additional embodiment, the flow meter is adapted to operate a preprogrammed cam through a timing gear, clutch and return bias arrangement. The cam is programmed to operate a pair of flow valves for delivering fluid to the waste dump and the rinsing means. Upon delivery of preprogrammed volumes of fluid through the flow meter, the timing gear engages the cam through the clutch and the cam is rotated through an operating cycle. At each stage of its operating cycle, the cam operates the flow valves to alternatively deliver fluid to the waste dump valve and to the rinsing means, for cleaning, rinsing and filling the waste tank. Upon completion of its operating cycle, the cam is disengaged from the timing gear and clutch arrangement through the return bias.

What is provided is a system that meters the delivery of fluid to the waste drain valve and the cleaning/rinsing system and automatically terminates the cleaning cycle upon delivery of the predetermined quantity of fluid. In the preferred embodiment an electronically operated flowmeter sends electronic pulses, which correspond to units of fluid volume, to an electronic module which signals the opening and closing of a pair of solenoid valves. When the desired volumes of fluid have been delivered to the waste drain valve and rinsing/cleaning system, the system shuts down.

In one alternative embodiment, a positive displacement flowmeter rotates a preprogrammed control valve equipped with fluid flow orifices and delivers fluid, through the control valve orifices, to the waste drain valve and cleaning/rinsing system. In yet another embodiment, the flowmeter rotates a preprogrammed cam which operates flow valves leading to the waste drain valve and the cleaning/rinsing system.

As shown in FIG. 1, other variations might use liquid level sensors 27, 27', and 27" in the waste tank 18 itself to determine the quantities of fluid to be used in the cleaning cycle. That is, a first sensor 27 would signal when the tank is drained and cause the dump valve to close while initiating a rinse cycle. A second sensor 27' could signal when enough rinse fluid had been provided and would command the reopening of the dump valve 16. After the retained rinse fluid had been drained out, the dump valve 16 again closes and additional fluid can be provided until a third sensor 27" signals a sufficient quantity of precharge liquid.

In each of the foregoing embodiments, alternate sequencing of the cleaning, rinsing and filling cycle can be accomplished. For example, in the preferred electronic embodiment described in FIG. 1, the electronic counter 22 can be programmed to provide for an intermediate phase in the cycle in which the tank is filled to approximately three quarters capacity. The tank would subsequently be dumped again and filled with the "precharge".

This intermediate phase could also be accomplished with the alternate embodiments. In the alternate embodiment of FIG. 4 which utilizes the preprogrammed control valve 70, the orifices on the control valve cylinder 72 can be structured to provide for the intermediate phase. In yet another alternate embodiment, the preprogrammed cam can be adapted to operate the flow valves in such a fashion as to provide the intermediate phase. Finally, as discussed above, the liquid level sensors 27, 27' and 27" could be arranged to provide for an intermediate filling phase prior to the final dumping and filling of the waste tank with the "precharge".

Various other embodiments could be devised according to the present invention by one who is skilled in the art. Accordingly, the scope of invention should be limited only by the scope of the claims appended thereto.

What is claimed as new is:

1. In combination with a lavatory waste tank having a waste drain and a fluid operated waste drain valve mounted in said tank to open and close said drain and tank rinsing means in said tank for rinsing the interior of said tank:
   (a) flow measuring means adapted to be connected to a source of rinsing fluid under pressure and for measuring at least first and second predetermined volumes of said rinsing fluid flowing therethrough:
   (b) controllable valve means coupled between said flow measuring means and waste drain valve and tank rinsing means; and
   (c) control means, responsive to said flow measuring means for operating, during the period in which said first predetermined volume is measured, said controllable valve means to receive said fluid under pressure from said flow measuring means and deliver said rinsing fluid to the waste drain valve to open said waste drain valve and to the rinsing means and thence to the waste tank and, during a period in which said second predetermined volume is measured, to receive said rinsing fluid under pressure from said flow measuring means and deliver said rinsing fluid to the rinsing means and thence to the waste tank; and prevent said rinsing fluid from said flow measuring means from being delivered to said waste drain valve to close said waste drain, whereby said rinsing fluid is supplied through said waste tank for at least a first predetermined period to rinse said tank, and is supplied to said waste tank for at least a second predetermined period to fill the tank.

2. The combination of claim 1, above, wherein said controllable valve means comprise first and second solenoid valves each adapted to be opened and closed by said control means for delivering a predetermined quantity of fluid to the waste drain valve and to the rinsing means, respectively.

3. The combination of claim 2, above, wherein said flow measuring means provides electrical signals corresponding to and representative of the volume of fluid flowing therethrough and further including:
   electronic counting means adapted to receive said electrical signals for generating control signals corresponding to and representative of predetermined volumes of fluid flow; and
   valve control means operatively connected to receive said control signals an operable in response thereto to regulate delivery of fluid from said first and second solenoid valves based upon said control signals.

4. The combination of claim 3, above, further including rechargeable electrical power supply means adapted to provide electrical power to said flow measuring means, said first and second solenoid valves, said electronic counting means and said valve control means, said electrical power supply means including charging means for recharging said electrical power supply means while the combination is quiescent.

5. The combination of claim 1, above, wherein:
   (a) said flow measuring means are adapted to provide rotational motion to said control means; and
   (b) said control means are operable in response to rotational motion for selectively operating said controllable valve means.

6. The combination of claim 5, above, wherein said controllable valve means comprises:
   (a) control valve cylinder means having fluid flow orifices in the walls thereof;
   (b) timing gear reduction means coupled to said flow measuring means for receiving rotational motion from said flow measuring means and responsive thereto to impart rotational motion to said control valve cylinder means;
   (c) pressure responsive clutch means connected to said control valve cylinder means and operable in response to fluid under pressure flowing through said control valve cylinder means for engaging said timing gear reduction means with said control valve cylinder means;
   (d) control valve piston means, coupled to said control valve cylinder means for imparting linear motion, in response to applied fluid pressure, to engage said clutch means thereby;
   (e) first bias means for providing a force resistive to said fluid pressure, for restoring said control valve cylinder means to an initial linear position upon the cessation of applied fluid pressure; and
   (f) second bias means coupled to said control valve cylinder means for providing a force opposing applied rotational motion, thereby restoring said control valve cylinder means to an initial rotational position upon disengagement of said clutch means, decoupling said control valve cylinder means from said timing gear reduction means.

7. The combination of claim 5, above, wherein said control means comprise:
   (a) transmission means providing a source of rotational motion to said control valve cylinder means from said flow measuring means, corresponding to and representative of fluid flow volume.

8. The combination of claim 7, above, wherein said transmission means comprises:
   (a) timing gear reduction means;
   (b) pressure responsive clutch means connected to said controllable valve means and operable in response to fluid under pressure flowing through said controllable valve means for coupling said timing gear reduction means to said controllable valve means; and
   (c) controllable valve return means coupled to said controllable valve means for placing said controllable valve means in an initial configuration when said clutch means decouples said timing gear reduction means from said controllable valve means.

9. The combination of claim 7, above, wherein said transmission means comprises:
   (a) a preprogrammed control cam, adapted to be rotated by said transmission means through an operating cycle.

10. The combination of claim 1, above, wherein said flow measuring means provides an electrical signal corresponding to and representative of the volume of fluid flowing through said flow measuring means and said control means are adapted to receive said electrical signals from said flow measuring means for regulating the delivery of fluid from said controllable valve means to the waste drain valve and rinsing means, based upon said electrical signals.

11. The combination of claim 10, above, wherein said control means comprises:
   (a) electronic counting means adapted to receive said electrical signals for generating control signals corresponding to and representative of predetermined volumes of fluid flow; and
   (b) valve control means, operatively connected to receive said control signals and responsive thereto to regulate delivery of fluid from said controllable valve means to the waste drain valve and rinsing means, based upon said control signals.

12. The combination of claim 10, above, further including electrical power supply means adapted to provide electrical power to said flow measuring means and said control means, wherein said power supply means includes charging means for recharging said power supply means while the combination is quiescent.

13. In combination with a lavatory waste tank having a waste drain and a fluid operated waste drain valve mounted in said tank to open and close said drain and means for rinsing the interior of said tank;
   (a) flow measuring means adapted to be connected to a source of rinsing fluid under pressure and to measure at least first and second predetermined volumes of said rinsing fluid flowing therethrough;
   (b) first and second valve means coupled between said flow measuring means and waste drain valve and tank rinsing means to receive said rinsing fluid under pressure from said flow measuring means;
   (c) transmission means adapted to receive rotational motion from said flow measuring means and to actuate said first and second valve means in response to said at least first and second predetermined volumes, whereby during the period in which said first predetermined volume is measured, said first valve means delivers said rinsing fluid to the waste drain valve and thence to the rinsing means and waste tank and, during the period in which said second predetermined volume is measured said second valve means delivers said rinsing fluid to the rinsing means the thence to the waste tank; and prevent said rinsing fluid from said flow measuring means form being delivered to said waste drain valve to close said waste drain; whereby said rinsing fluid is supplied through said waste tank for at least a first predetermined period to rinse said tank, and is supplied to said waste tank for at least a second predetermined period to fill the tank.

14. The combination of claim 13, wherein said transmission means further comprises:
   (a) timing gear reduction means;
   (b) pressure responsive clutch means connected to said first and second valve means and operable in response to fluid under pressure flow through said valve means for coupling said timing gear reduction means to actuate said valve means;
   (c) valve return means coupled to said first and second valve means for placing said valve means in an initial configuration when said clutch means decouples said timing gear reduction means from said controllable valve means.

15. The combination of claim 14, above, wherein said transmission means further comprises:
   (a) a preprogrammed control cam, adapted to be driven by said timing gear reduction means through said clutch means, for driving said cam through an operating cycle.

16. The combination of claim 13, above, wherein said first and second valve means include control valve cylinder means having fluid flow orifices in the walls thereof corresponding to first and second valves and coupled to receive fluid under pressure from said flow measuring means for delivering fluid through said first valve to the waste drain valve, and through said second valve to the rinsing means; the combination further including:

timing gear reduction means coupled to said flow measuring means for receiving rotational motion imparted therefrom and responsive thereto to impart rotational motion;

pressure responsive clutch means connected to said control valve cylinder means and operable in response to fluid under pressure flowing through said control valve cylinder means for releasably coupling said timing gear reduction means to said control valve cylinder means for transmitting rotational motion therebetween;

control valve piston means coupled to said control valve cylinder means for providing linear motion in response to applied fluid pressure to engage said clutch means thereby;

first bias means providing a resistive force against said fluid pressure, for disengaging said control valve cylinder means from said clutch means upon the cessation of applied fluid pressure; and second bias means for providing a force opposing rotational motion for restoring said cylinder means to an initial rotational position upon disengagement of said cylinder means from said clutch means;

whereby said timing gear reduction means rotates said control valve cylinder through said clutch means to enable said first and second valves in a predetermined sequence to apply fluid to the waste drain valve and to the rinsing means.

17. In combination with a lavatory waste tank having a waste drain and a fluid operated waste drain valve mounted in said tank to open and close said drain and tank rinsing means in said tank for rinsing the interior of said tank:
  (a) volume measuring means adapted to generate signals corresponding to a drained waste tank, and a rinse volume and a precharge volume of the rinsing fluid levels in the waste tank;
  (b) solenoid valve means coupled to receive rinsing fluid under pressure and adapted to be opened and closed for delivering predetermined volumes of said rinsing fluid to the waste drain valve and the rinsing means;
  (d) valve control means operatively connected to receive signals from said volume measuring means and operable in response thereto to regulate selectively delivery of said rinsing fluid from said solenoid valve means to the waste drain valve or to rinsing means, and thence to the waste tank, based upon said control signals whereby during a first period, said valve means delivers rinsing fluid to said waste drain valve until said waste tank is drained, and, during a second period, said valve means delivers rinsing fluid to said rinsing means until said waste tank contains a rinse volume of rinsing fluid, and, during a third period, said valve means delivers rinsing fluid to said waste drain valve until said waste tank is drained, and, during a fourth period, said valve means delivers rinsing fluid to said rinsing means until said waste tank contains a precharged volume of said rinsing fluid.

18. The combination of claim 17 above, further including electrical power supply means adapted to provide electrical power to said volume measuring means, said solenoid valve means and said valve control means wherein said power supply means includes charging means for recharging said power supply means while the combination is quiescent.

* * * * *